United States Patent
Yoo

(10) Patent No.: US 8,243,439 B2
(45) Date of Patent: Aug. 14, 2012

(54) SLIDER MECHANISM FOR OPENING AND CLOSING A PORTABLE TERMINAL

(76) Inventor: Chung Keun Yoo, Bucheon-si (KR)

(*) Notice: Subject to any disclaimer, the term of this patent is extended or adjusted under 35 U.S.C. 154(b) by 224 days.

(21) Appl. No.: 12/738,599

(22) PCT Filed: Oct. 17, 2008

(86) PCT No.: PCT/KR2008/006153
§ 371 (c)(1),
(2), (4) Date: Aug. 24, 2010

(87) PCT Pub. No.: WO2009/051444
PCT Pub. Date: Apr. 23, 2009

(65) Prior Publication Data
US 2011/0038106 A1 Feb. 17, 2011

(30) Foreign Application Priority Data
Oct. 18, 2007 (KR) .................. 10-2007-0105127

(51) Int. Cl.
*G06F 1/16* (2006.01)
*H04M 1/00* (2006.01)

(52) U.S. Cl. ........... 361/679.55; 361/679.56; 455/575.1; 455/575.4

(58) Field of Classification Search .......... 361/679.01–679.45, 679.55–679.59; 455/575.1, 575.4; 345/156, 157, 168, 169
See application file for complete search history.

(56) References Cited

U.S. PATENT DOCUMENTS

| | | | |
|---|---|---|---|
| 5,704,094 A | 1/1998 | Hartigan et al. | |
| 7,184,806 B2* | 2/2007 | Bae | 455/575.4 |
| 7,218,509 B2* | 5/2007 | Liao et al. | 455/347 |
| 7,257,432 B2* | 8/2007 | Nan | 455/575.4 |
| 7,353,568 B2 | 4/2008 | Duan et al. | |
| 7,417,865 B2* | 8/2008 | Kim | 361/727 |
| 7,774,033 B2* | 8/2010 | Lee | 455/575.4 |
| 2004/0203496 A1* | 10/2004 | Bae et al. | 455/90.1 |
| 2006/0128353 A1 | 6/2006 | Pan | |

FOREIGN PATENT DOCUMENTS

CN 2601490 1/2004
(Continued)

OTHER PUBLICATIONS

Written Opinion of the International Search Authority, dated Apr. 17, 2009, for International Patent Application No. PCT/KR2008/006153.

(Continued)

*Primary Examiner* — Jayprakash N Gandhi
*Assistant Examiner* — Nidhi Desai
(74) *Attorney, Agent, or Firm* — Harness, Dickey & Pierce, P.L.C.

(57) ABSTRACT

The present invention relates to a sliding opening and closing device for a portable terminal. The sliding opening and closing device for a portable terminal according to the present invention includes: a first plate; a second plate slidably joined to the first plate; a cam profile formed at the first plate along a sliding direction of the second plate; and an elastic module mounted on the second plate, wherein one end of the elastic module is in contact with the cam profile to slide therealong. A guide part is formed at the first plate and the cam profile is formed along an edge portion of the guide part.

17 Claims, 5 Drawing Sheets

FOREIGN PATENT DOCUMENTS

| | | |
|---|---|---|
| CN | 2627756 | 7/2004 |
| CN | 1741722 | 3/2006 |
| EP | 1793568 | 2/2010 |
| FR | 9715031 | 6/1999 |
| GB | 02355043 | 4/2001 |
| JP | 11-112630 | 4/1999 |
| JP | 11-341130 | 12/1999 |
| JP | 2002-227832 | 8/2002 |
| KR | 10-0208110 | 7/1999 |
| KR | 2000-0014212 | 7/2000 |
| KR | 10-0296038 | 5/2001 |
| KR | 10-2001-0051938 | 6/2001 |
| KR | 10-2002-0043065 | 6/2002 |
| KR | 10-2004-0067058 | 7/2004 |
| KR | 10-2005-0031312 | 4/2005 |
| KR | 10-2005-0108671 | 11/2005 |
| KR | 10-2006-0033199 | 4/2006 |
| KR | 10-2006-0043065 | 5/2006 |
| KR | 10-2006-0072365 | 6/2006 |
| KR | 10-2006-0102975 | 9/2006 |
| KR | 10-0635432 | 10/2006 |
| KR | 10-0727601 | 6/2007 |
| TW | I292298 | 1/2008 |
| WO | 2009/051444 | 4/2009 |

OTHER PUBLICATIONS

International Search Report, dated Apr. 17, 2009, for International Patent Application No. PCT/KR2008/006153.

Korean Office Action, dated Jul. 30, 2008, for Korean Patent Application No. 10-2007-0105127.

Korean Final Office Action, dated Feb. 14, 2009, for Korean Patent Application No. 10-2007-0105127.

* cited by examiner

SLIDER MECHANISM FOR OPENING AND CLOSING A PORTABLE TERMINAL

CROSS REFERENCE TO RELATED APPLICATIONS

This application is a 371 of PCT International Application No. PCT/KR2008/006153 filed Oct. 17, 2008, published as WO 2009/051444 on Apr. 23, 2009, which claims priority to Korean Patent Application No. KR 10-2007-0105127 filed Oct. 18, 2007. The entire disclosure of the above application is incorporated herein by reference.

TECHNICAL FIELD

The present invention generally relates to a sliding opening and closing device for a portable terminal, and more particularly to a sliding opening and closing device for a portable terminal, which is capable of slimming down a cellular phone.

BACKGROUND ART

Electronic devices such as portable wireless terminals are now widely used. Thus, portable terminals have been required to have a supplementary function, which complies with a user's preference on an opening and closing operation, in addition to an inherent function of performing wireless communication.

In order to meet such a requirement, the portable terminals have been developed from a general bar type to a flip type, a flip up type, a folder type, etc. In recent years, the folder type terminals have been widely used.

Specifically, the folder type terminal has a space large enough to employ a wide LCD module as a display device. Moreover, since it can be carried while being half-folded, the folder type terminal has a superior portability compared to the other types of terminals.

Further, a slide type terminal has also been introduced in the art. The slide type terminal may have a display device, which is equipped with a wide LCD module sized similarly to that of the folder type terminal. Thus, this may contribute to the miniaturization of the terminals.

The slide type terminal is constituted such that a sub plate or cover can be slidably opened and closed on a main plate. The slide type terminal is advantageous in that it has the advantages of the existing folder type terminal and can be further opened and closed in a novel manner.

As one example of the slide type terminal, Korean Utility Model Application No. 2003-0000136 discloses a slide type portable wireless terminal.

The terminal disclosed in the above document includes: guiding means for guiding a sub plate on a main plate; and at least one elastic means disposed between the sub plate and the main plate for changing a direction of a biasing force to an opening or closing direction based on some sliding positions of the sub plate.

Due to the elastic means, the sub plate can maintain a maximum open or closed position without any special stopper when being fully opened or closed.

A torsion spring, one end of which is fixed to the main plate while its other end is fixed to the sub plate, is employed as the elastic means.

Since one end of the torsion spring is fixed to the main plate while its other end is fixed to the sub plate, the elastic force of the torsion spring acts throughout a total movement distance of the sub plate. Thus, the torsion spring is placed in a great tension and slackened thereafter.

As such, a torsion spring, which has a large working range and a small elastic force, is used. Further, two torsion springs of such type are used to supplement an insufficient elastic force.

Thus, in a conventional opening and closing device, the torsion spring deforms to a great extent. Accordingly, there is a problem with the conventional opening and closing device in that the torsion spring becomes easily worn out due to the fatigue caused by its repetitive motions. Consequently, the opening and closing device easily loses its opening and closing function.

In order to solve such a problem, Korean Patent Application No. 10-2007-0051494, which was filed by the present applicant, discloses a sliding opening and closing device as illustrated in FIGS. 1 and 2.

The sliding opening and closing device for a portable terminal disclosed in the above document includes a first plate 10, a second plate 20, a plunger 30, a spring 40 and a stopper cushion 50.

The first plate 10 is mounted on a main body of a portable terminal. A cam profile 12 with a corrugated surface is formed at one side of the first plate 10 along a sliding direction of the second plate 20 (i.e., upward and downward directions).

The second plate 20 is mounted on a sliding body of the portable terminal. The second plate is mounted to the first plate 10 in order to slide up and down relative thereto.

To this end, guide grooves 11, which are elongated in the upward and downward directions, are formed at both lateral sides of the first plate 10. Further, elongated guide protrusions 21, which are inserted into the guide grooves 11 in order to slide therealong, are formed at both lateral sides of the second plate 20.

That is, they are configured such that the guide grooves 11 formed at the lateral sides of the first plate 10 cover the guide protrusions 21 formed at the lateral sides of the second plate 20.

The plunger 30 is mounted on the second plate 20 to slide in a direction perpendicular to the sliding direction of the second plate 20 (i.e., right and left directions).

A roller 35 is mounted to one end of the plunger 30 so as to be placed in contact with the cam profile 12 with the corrugated surface.

However, in case of the above-described conventional sliding opening and closing device, the plunger 30 and the spring 40 are disposed between the first plate 10 and the second plate 20.

Accordingly, the opening and closing device becomes thicker due to the thicknesses of the plunger 30 and the spring 40. Thus, a cellular phone becomes significantly thick, which is clearly disadvantageous.

DISCLOSURE

Technical Problem

The present invention is directed to solving the foregoing problems of the prior art. It is an object of the present invention to provide a sliding opening and closing device for a portable terminal, which causes a cellular phone to be thin while permitting the cellular phone to slide in order to facilitate its opening and closing.

Technical Solution

In order to achieve the above objects, a sliding opening and closing device for a portable terminal according to the present invention comprises: a first plate coupled to one of a main body and a display body of the portable terminal; a second plate slidably joined to the first plate, the second plate being coupled to the other of the main body and the display body; a cam profile formed at the first plate along a sliding direction of the second plate; and an elastic module mounted on the second plate, one end of the elastic module being in contact with the cam profile to slide therealong, wherein a guide part for slidably guiding the second plate is formed at the first plate, the guide part covering a side surface of the second plate and a portion of an opposite surface of the second plate, the opposite surface being opposed to one surface of the second plate facing the first plate, wherein the cam profile is formed along an edge portion of the guide part, and wherein the elastic module is mounted on the second plate so as to be in contact with the cam profile.

The elastic module is slidably mounted in a direction perpendicular to the sliding direction of the second plate.

The elastic module comprises: a housing mounted on the second plate; a plunger slidably inserted into the housing; a roller rotatably mounted to a front side of the plunger and being in contact with the cam profile; and a spring insertedly mounted to the housing for applying an elastic force to the plunger.

A seat groove for seating the elastic module thereon is formed at the second plate.

The cam profile is made from a synthetic resin.

Advantageous Effects

According to the sliding opening and closing device for a portable terminal of the present invention, since the cam profile is formed at the guide parts covering the second plate, the second plate can slide up and down and the sliding opening and closing device can be made to be thin.

BEST MODE FOR CARRYING OUT THE INVENTION

Figure 1:
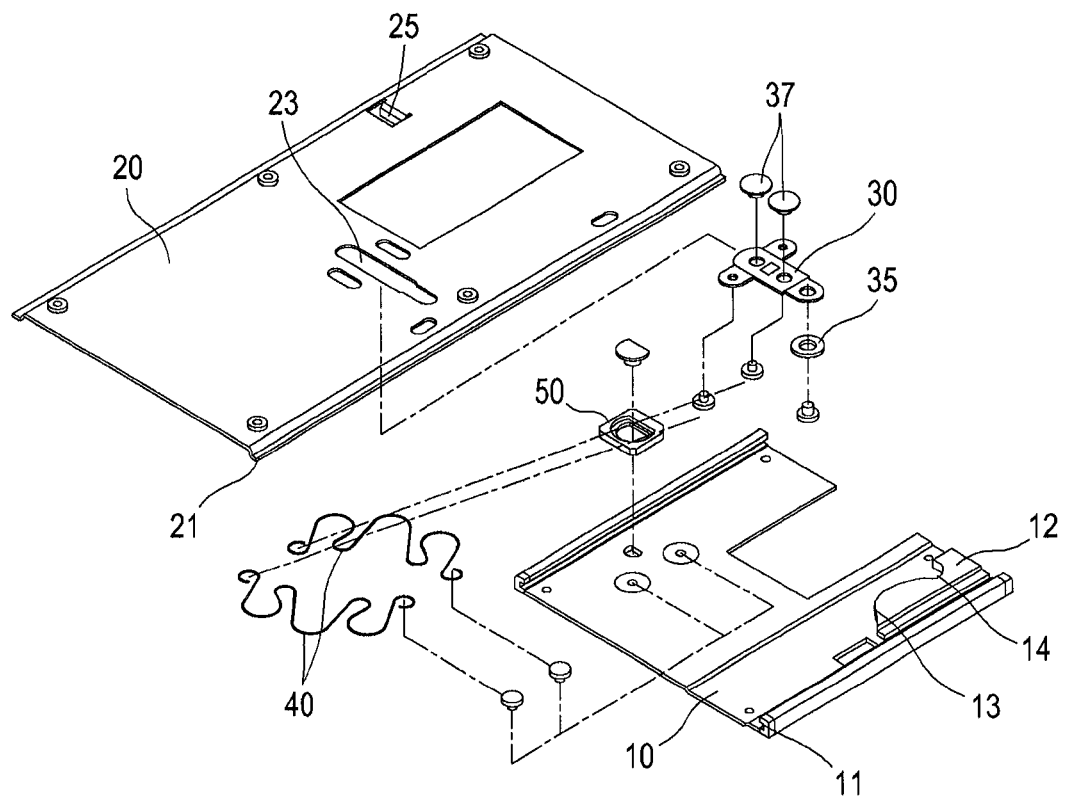
FIG. 1 is an exploded perspective view of a conventional sliding opening and closing device for a portable terminal.
Figure 2:
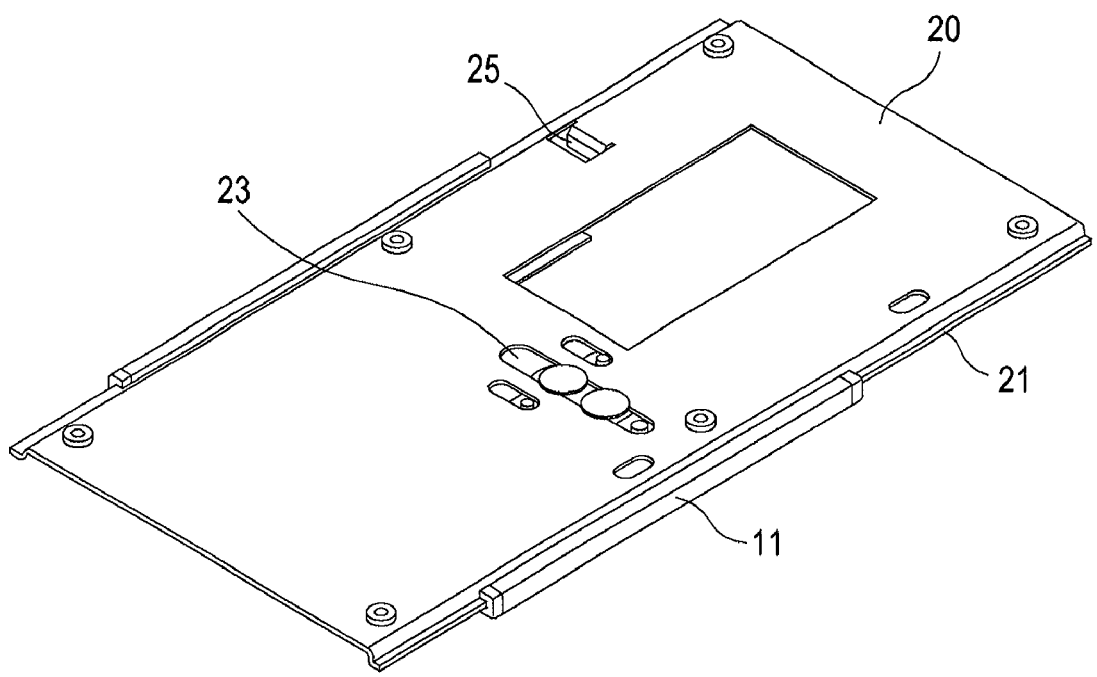
FIG. 2 is a perspective view of the sliding opening and closing device for a portable terminal shown in FIG. 1.
Figure 3:
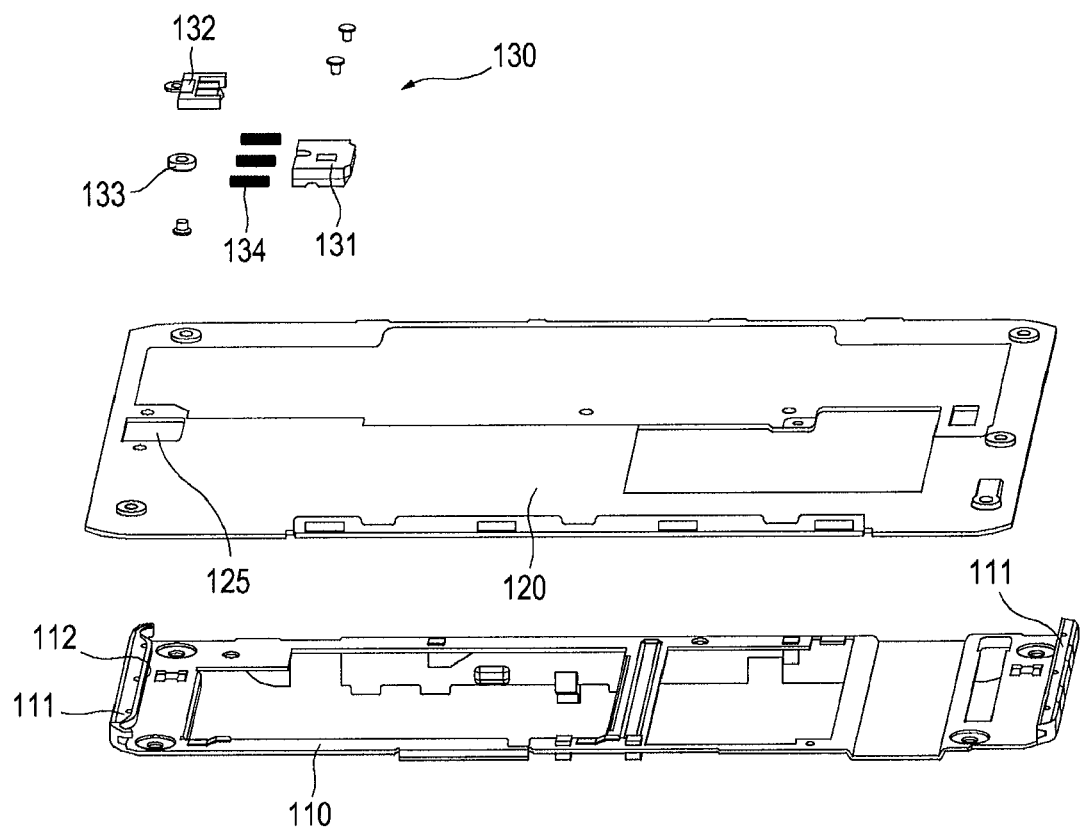
FIG. 3 is an exploded perspective view of a sliding opening and closing device for a portable terminal in accordance with an embodiment of the present invention.
Figure 4:
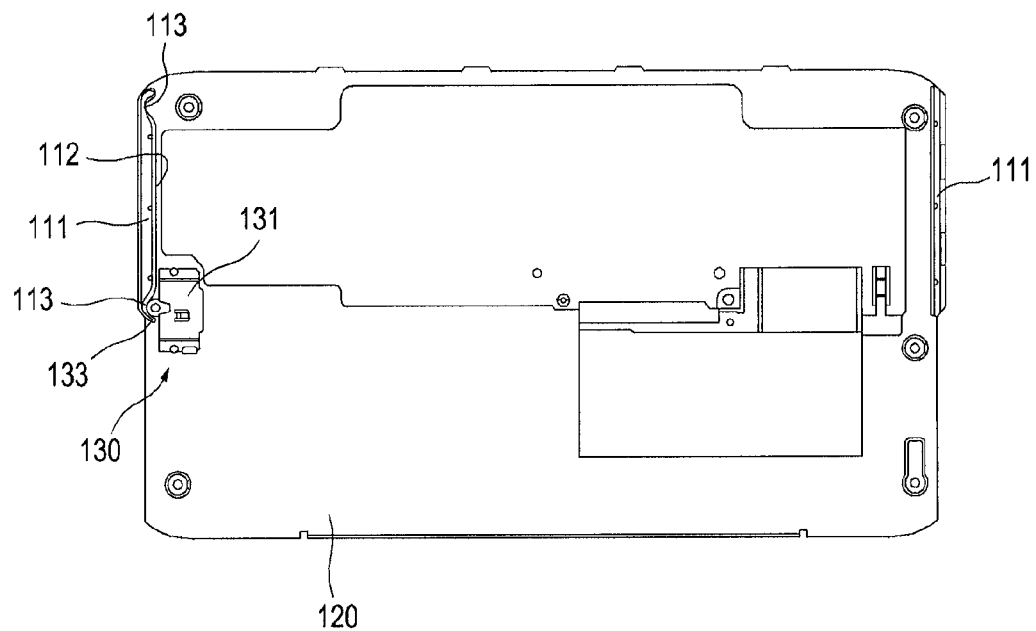
FIG. 4 is a top plan view of a sliding opening and closing device for a portable terminal in accordance with an embodiment of the present invention.
Figure 5:
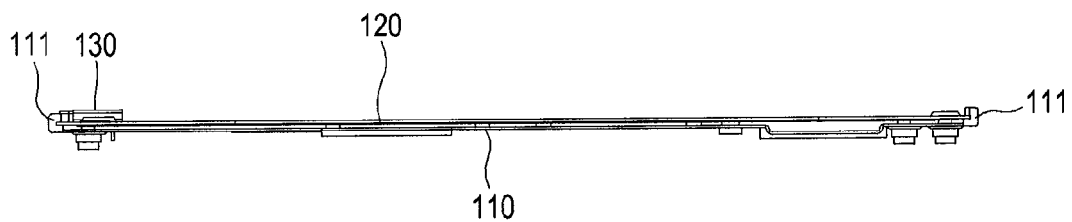
FIG. 5 is a front view of a sliding opening and closing device for a portable terminal in accordance with an embodiment of the present invention.

FIG. 3 is an exploded perspective view of a sliding opening and closing device for a portable terminal in accordance with an embodiment of the present invention. FIG. 4 is a top plan view of a sliding opening and closing device for a portable terminal in accordance with an embodiment of the present invention. FIG. 5 is a front view of a sliding opening and closing device for a portable terminal in accordance with an embodiment of the present invention.

As shown in FIGS. 3 to 5, the sliding opening and closing device for a portable terminal of the present invention comprises: a first plate 110; a second plate 120; a cam profile 112; and an elastic module 130.

The first plate 110 has a plate-like shape and is mounted to a main body of a cellular phone.

The second plate 120 has a plate-like shape and is coupled to the first plate 110 so as to be slidable up and down. The second plate 120 is mounted to a sliding body of the cellular phone.

In order to allow the second plate 120 to slide up and down relative to the first plate 110, guide parts 111, which cover both lateral sides of the second plate 120, are provided at both lateral sides of the first plate 110.

Specifically, the guide part 111 covers a side surface of the second plate 120. Further, the guide part 111 covers a portion of an opposite surface of the second plate 120, which is opposed to one surface of the second plate 120 facing the first plate 110.

Thus, the second plate 120 can slide up and down relative to the first plate 110 as both lateral sides of the second plate 120 are covered by the guide parts 111.

Further, the guide parts 111 partially cover an upper surface of the second plate 120 to allow the first plate 110 and the second plate 120 to be in a coupling relation.

The cam profile 112 is elongatedly formed at an edge of the guide part 111 of the first plate 110 along a sliding direction of the second plate 120.

The cam profile 112 may be formed at any one of the guide parts 111, which are formed at both lateral sides of the first plate 110.

A plurality of stop grooves 113 are formed on the cam profile 112. The cam profile 112 may be integrally formed to the guide part 111. The cam profile may be separately manufactured and attached to the guide part 111.

In case the cam profile 112 is separately manufactured, the cam profile 112 is preferably made from a synthetic resin.

The elastic module 130 is mounted on the second plate 120 to move up and down together therewith. One end of the elastic module 130 is placed in contact with the cam profile 112 to slide in a direction perpendicular to the sliding direction of the second plate 120.

The elastic module 130 comprises a housing 131, a plunger 132, a roller 133 and a spring 134.

The housing 131 is mounted on the second plate 120. The plunger 132 is slidably mounted in the housing 131.

The roller 133 is rotatably coupled to a front side of the plunger 132. At a back side of the plunger 132, the spring 134 is insertedly mounted in the housing 131 to apply an elastic force toward the plunger 132.

Thus, the plunger 132 is allowed to move forward by the elastic force of the spring 134, while the roller 133 coupled to the front side of the plunger 132 is brought into contact with the cam profile 112.

Further, the elastic module 130 is mounted on the upper surface of the second plate 120 such that the roller 133 is placed in contact with the cam profile 112 formed on the guide part 111.

A seat groove 125 for seating the elastic module 130 thereon is formed at the second plate 120. The seat groove enables the elastic module 130 to be more easily coupled to the second plate 120.

As described above, the cam profile 112 is not formed separately at an inner side of the first plate 110. Rather, it is formed at the guide part 111 covering the second plate 120, thereby reducing the thickness of the opening and closing device.

That is, when the guide parts 111 cover both side surfaces of the second plate 120 and the cam profile 112 is formed inside the first plate 110, the opening and closing device becomes thick as a whole due to the thickness of the guide parts 111 and the cam profile 112.

In contrast, when the guide parts 111 cover both side surfaces of the second plate 120, the cam profile 112 is formed at the guide part 111 and the elastic module 130 is mounted on the upper surface of the second plate 120, the thickness taken by the cam profile 112 can be excluded. Thus, the opening and closing device can be made to be thin, as shown in FIG. 5.

The sliding opening and closing device for a portable terminal according to the present invention should not be limited to the above-described embodiments and may be embodied in various manners within the scope of the subject matter of the present invention.

The invention claimed is:

1. A sliding opening and closing device for a portable terminal, comprising: a first plate coupled to one of a main body and a display body of the portable terminal; a second plate slidably coupled to the first plate, the second plate being coupled to the other of the main body and the display body; a cam profile formed at the first plate along a sliding direction of the second plate; an elastic module mounted on the second plate, one end of the elastic module being in contact with the cam profile to slide there along; a guide part for slidably guiding the second plate formed at the first plate, the guide part covering a side surface of the second plate and a portion of an opposite surface of the second plate, the opposite surface being opposed to one surface of the second plate facing the first plate; and the cam profile being formed along an edge portion of the guide part; wherein the elastic module comprises: a housing mounted on the second plate; a plunger slidably mounted in the housing; a roller rotatably coupled to a front side of the plunger and being in contact with the cam profile; and a spring insertedly mounted in the housing for applying an elastic force to the plunger; and wherein the elastic module is mounted on an upper surface of the second plate opposite the surface of the second plate facing the first plate such that the elastic module is not disposed between the first and second plates.

2. The sliding opening and closing device of claim 1, wherein the one end of the elastic module is placed in contact with the cam profile to slide in a direction perpendicular to the sliding direction of the second plate.

3. The sliding opening and closing device of claim 1, wherein a seat groove for seating the elastic module thereon is formed in the second plate.

4. The sliding opening and closing device of claim 1, wherein the cam profile is made from a synthetic resin.

5. The sliding opening and closing device of claim 1, wherein the guide part comprises guide parts at both lateral sides of the first plate, the guide parts covering lateral side surfaces of the second plate and partially covering an upper surface of the second plate opposite the surface of the second plate facing the first plate.

6. The sliding opening and closing device of claim 5, wherein the cam profile is formed at an edge of one of the guide parts along a sliding direction of the second plate, such that cam profile is not formed separately at an inner side of the first plate.

7. The sliding opening and closing device of claim 5, wherein the cam profile is integrally formed to one of the guide parts.

8. The sliding opening and closing device of claim 5, wherein the cam profile is attached to one of the guide parts.

9. The sliding opening and closing device of claim 5, wherein the guide parts partially cover an upper surface of the second plate opposite the surface of the second plate facing the first plate, to allow the first plate and the second plate to be in a coupling relation.

10. The sliding opening and closing device of claim 1, wherein a plurality of stop grooves are formed on the cam profile.

11. The sliding opening and closing device of claim 1, wherein the spring comprises three springs at a back side of the plunger for applying an elastic force toward the plunger.

12. A portable terminal including the sliding opening and closing device of claim 1.

13. A sliding opening and closing device for a portable terminal, comprising: a first plate coupled to one of a main body and a display body of the portable terminal, the first plate including lateral sides; a second plate slidably coupled to the first plate, the second plate being coupled to the other of the main body and the display body, the second plate including lateral side surfaces, a lower surface facing the first plate, and an upper surface opposite the lower surface; guide parts formed at the lateral sides of the first plate for slidably guiding the second plate, the guide parts respectively covering the lateral side surfaces of the second plate and partially covering the upper surface of the second plate; a cam profile formed at an edge of one of the guide parts of the first plate along a sliding direction of the second plate; a housing mounted on the upper surface of the second plate; a plunger slidably mounted in the housing to slide in a direction perpendicular to the sliding direction of the second plate; a roller rotatably coupled to a front side of the plunger in contact with the cam profile; and a spring insertedly mounted in the housing for applying an elastic force to the plunger; wherein the housing, plunger, roller, and spring are not disposed between the first and second plates.

14. The sliding opening and closing device of claim 13, wherein a plurality of stop grooves are formed on the cam profile.

15. The sliding opening and closing device of claim 13, wherein the spring comprises three springs at a back side of the plunger for applying an elastic force toward the plunger.

16. A sliding opening and closing device for a portable terminal, comprising: a first plate coupled to one of a main body and a display body of the portable terminal, the first plate including lateral sides; a second plate slidably coupled to the first plate, the second plate being coupled to the other of the main body and the display body, the second plate including lateral side surfaces, a lower surface facing the first plate, an upper surface opposite the lower surface, and a seat groove; guide parts formed at the lateral sides of the first plate for slidably guiding the second plate, the guide parts respectively covering the lateral side surfaces of the second plate and partially covering the upper surface of the second plate; a cam profile formed at an edge of one of the guide parts of the first plate along a sliding direction of the second plate; a plurality of stop grooves are formed on the cam profile; an elastic module seated within the seat groove of the second plate such that the elastic module is not disposed between the first and second plates, the elastic module including: a housing mounted on the upper surface of the second plate; a plunger slidably mounted in the housing to slide in a direction perpendicular to the sliding direction of the second plate; a roller rotatably coupled to a front side of the plunger in contact with the cam profile; and one or more springs insertedly mounted in the housing at a back side of the plunger for applying an elastic force toward the plunger; wherein the housing, plunger, roller, and spring are not disposed between the first and second plates.

17. A portable terminal including the sliding opening and closing device of claim 16.

* * * * *